US012597014B2

(12) United States Patent
Park et al.

(10) Patent No.: US 12,597,014 B2
(45) Date of Patent: Apr. 7, 2026

(54) COLD WALLET APPARATUS AND METHOD OF CONTROLLING THE SAME

(71) Applicant: ELECTRONICS AND TELECOMMUNICATIONS RESEARCH INSTITUTE, Daejeon (KR)

(72) Inventors: Seong Cheon Park, Daejeon (KR); Hyeok Jin Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 168 days.

(21) Appl. No.: 18/504,739

(22) Filed: Nov. 8, 2023

(65) Prior Publication Data

US 2024/0152904 A1 May 9, 2024

(30) Foreign Application Priority Data

Nov. 8, 2022 (KR) ........................ 10-2022-0148118
Nov. 6, 2023 (KR) ........................ 10-2023-0152163

(51) Int. Cl.
*G06Q 20/36* (2012.01)
*G06Q 20/38* (2012.01)
(Continued)

(52) U.S. Cl.
CPC ....... *G06Q 20/367* (2013.01); *G06Q 20/3827* (2013.01); *G06Q 20/40145* (2013.01);
(Continued)

(58) Field of Classification Search
CPC ............. G06Q 20/367; G06Q 20/3827; G06Q 20/40145; G06Q 30/018; G06Q 20/3674;
(Continued)

(56) References Cited

U.S. PATENT DOCUMENTS

| 10,007,773 B2 | 6/2018 | Benteo et al. |
| 10,771,459 B2 | 9/2020 | Kim et al. |
| (Continued) | | |

FOREIGN PATENT DOCUMENTS

| KR | 10-2372709 B1 | 3/2022 |
| KR | 10-2447320 B1 | 9/2022 |
| (Continued) | | |

OTHER PUBLICATIONS

Pascal Urien, Innovative Countermeasures to Defeat Cyber Attacks Against Blockchain Wallets, IEEE, 2021 5th Cyber Security in Networking Conference (CSNet), pp. 49-54 (Year: 2021).*

*Primary Examiner* — Yingying Zhou

(57) ABSTRACT

The present invention relates to a cold wallet apparatus. The cold wallet apparatus includes a homomorphic encryption generation module configured to generate homomorphic encryption using personally identifiable sensitive information; a first authentication code extraction module configured to extract an authentication code from the homomorphic encryption; a second authentication code extraction module configured to extract an authentication code from physical unclonable function (PUF) information of the cold wallet apparatus; a private key generation module configured to combine the authentication code extracted from the homomorphic encryption and the authentication code extracted from the PUF information to generate a private key; and a transaction signature module configured to perform a transaction signature using a wallet account and a wallet address generated based on the private key.

19 Claims, 2 Drawing Sheets

(51) Int. Cl.

| | |
|---|---|
| *G06Q 20/40* | (2012.01) |
| *H04L 9/00* | (2022.01) |
| *H04L 9/32* | (2006.01) |

(52) U.S. Cl.
CPC ............ *H04L 9/008* (2013.01); *H04L 9/3231* (2013.01); *H04L 9/3278* (2013.01)

(58) Field of Classification Search
CPC ... G06Q 20/4014; H04L 9/008; H04L 9/3231; H04L 9/3278; H04L 9/0866; H04L 9/3247; H04L 9/50; G06F 21/32
See application file for complete search history.

(56) References Cited

U.S. PATENT DOCUMENTS

| | | | | |
|---|---|---|---|---|
| 10,826,897 | B2 | 11/2020 | Huh et al. | |
| 10,999,059 | B2 * | 5/2021 | Shi ...................... | G06Q 20/389 |
| 11,218,324 | B2 * | 1/2022 | Wentz ................... | H04L 9/088 |
| 11,240,040 | B2 | 2/2022 | Wentz | |
| 2014/0068780 | A1 * | 3/2014 | Kim ...................... | H04W 12/12 |
| | | | | 726/26 |
| 2020/0195446 | A1 * | 6/2020 | Lepoint ............... | H04L 63/0435 |
| 2020/0233980 | A1 * | 7/2020 | Lee ......................... | G06F 21/73 |
| 2023/0127927 | A1 * | 4/2023 | Chen .................... | G06N 3/0455 |
| | | | | 726/26 |
| 2023/0216947 | A1 * | 7/2023 | Bernardi ................ | H04L 67/10 |
| | | | | 713/150 |
| 2023/0361985 | A1 * | 11/2023 | Raheman ................ | G06F 21/64 |
| 2024/0137228 | A1 * | 4/2024 | Davies .................. | H04L 9/3247 |
| 2025/0132919 | A1 * | 4/2025 | Hu ......................... | H04L 9/3231 |

FOREIGN PATENT DOCUMENTS

| | | |
|---|---|---|
| KR | 10-2451246 B1 | 10/2022 |
| WO | 2022/069135 A1 | 4/2022 |

* cited by examiner

COLD WALLET APPARATUS AND METHOD OF CONTROLLING THE SAME

CROSS-REFERENCE TO RELATED APPLICATIONS

This application claims priority to and the benefit of Korean Patent Application No. 10-2022-0148118, filed on Nov. 8, 2022 and Korean Patent Application No. 10-2023-0152163, filed on Nov. 6, 2023, which are hereby incorporated by reference for all purposes as if set forth herein.

BACKGROUND

1. Field of the Invention

The present invention relates to a cold wallet apparatus and a method of controlling the same, and more particularly, to a cold wallet apparatus capable of ensuring private information using which an original author or owner of a digital asset is identifiable and issuing a non-fungible token (NFT) including the information, and a method of controlling the same.

2. Discussion of Related Art

In general, non-fungible tokens (NFTs) are generated with blockchain technology. The NFTs are means of proving that digital assets are original because each NFT has a unique value.

Non-fungible attributes of the NFTs may be used for proving originality, authenticity, and uniqueness of digital work, proving a collection and purchase history, and giving a value of scarcity.

However, the NFTs are issued only to an issuer's own electronic wallet. The electronic wallet has a unique random value to ensure anonymity, and the NFTs are signed through a unique random value, so there is a problem in that it is impossible to know who issues the NFTs.

That is, NFTs issued for digital assets (e.g., digital work) using the existing electronic wallets are not signed with rights of original authors or owners, but are signed with rights of anonymous electronic wallet owners, so there is a problem in that it is impossible to know who the owners of the digital assets (e.g., digital work) are.

Accordingly, it is necessary for NFTs to be signed so that the NFTs including information using which original authors or owners in NFT information issued for digital assets (e.g., digital work) are specifiable are issued. However, when information (i.e., corresponding to sensitive information as a type of personal information) using which the original authors or owners of digital assets (e.g., digital work) are specifiable is included in NFT issuance information, there is a problem in that it is impossible to ensure the privacy of the original authors or owners.

Therefore, when NFTs of digital assets (e.g., digital work) are issued, there is a need for a method of proving an original author or owner of a digital asset (e.g., digital work), if necessary, while ensuring private information on the original author or owner of the digital assets (e.g., digital work) corresponding to sensitive information.

The background art of the present invention is disclosed in Korean Patent No. 10-2447320 (Sep. 21, 2022).

SUMMARY OF THE INVENTION

The present invention provides a cold wallet apparatus capable of ensuring private information using which an original author or owner of a digital asset is identifiable and issuing a non-fungible token (NFT) including the information, and a method of controlling the same.

According to an embodiment, a cold wallet apparatus includes: a homomorphic encryption generation module configured to generate homomorphic encryption using personally identifiable sensitive information; a first authentication code extraction module configured to extract an authentication code from the homomorphic encryption; a second authentication code extraction module configured to extract an authentication code from physical unclonable function (PUF) information of the cold wallet apparatus; a private key generation module configured to combine the authentication code extracted from the homomorphic encryption and the authentication code extracted from the PUF information to generate a private key; and a transaction signature module configured to perform a transaction signature using a wallet account and a wallet address generated based on the private key.

The homomorphic encryption generation module may additionally receive a private key for homomorphic encryption generation, and combine the private key for homomorphic encryption generation and the personally identifiable sensitive information according to a specified algorithm to generate the homomorphic encryption.

The cold wallet apparatus method may further include a private key input module for homomorphic encryption generation and a personal information input module to separately receive the private key for homomorphic encryption generation and the personally identifiable sensitive information.

The personally identifiable sensitive information may be unique information of an individual user and include at least one of a plurality of pieces of personal identification information including a fingerprint, an iris, and deoxyribonucleic acid (DNA).

The first authentication code extraction module and the second authentication code extraction module may each extract a hash-based message authentication code (HMAC) value as the authentication code using a hash-based message authentication code-secure hash algorithm 512 (HMAC-SHA512) method.

The cold wallet apparatus may further include a separate storage module configured to store the PUF information.

The private key generation module may combine a HMAC value, which is the authentication code extracted from the homomorphic encryption, and a lower byte of the HMAC value, which is the authentication code extracted from the PUF information, in a specified manner to generate the HMAC value, and outputs the HMAC value as the private key.

The transaction signature module may further include a public key generated based on the private key to perform the transaction signature.

The homomorphic encryption generation module, the first authentication code extraction module, the second authentication code extraction module, the private key generation module, and the transaction signature module may be implemented integrally by at least one processor.

According to another embodiment, a method of controlling a cold wallet apparatus includes: generating, by a homomorphic encryption generation module, homomorphic encryption using personally identifiable sensitive information; extracting, by a first authentication code extraction module, an authentication code from the homomorphic encryption; extracting, by a second authentication code extraction module, the authentication code from PUF information of the cold wallet apparatus; combining, by a private key generation module, the authentication code extracted from the homomorphic encryption and the authentication code extracted from the PUF information to generate a private key; and performing, by a transaction signature module, a transaction signature using a wallet account and a wallet address generated based on the private key.

In the generating of the homomorphic encryption, the homomorphic encryption generation module may additionally receive a private key for homomorphic encryption generation, and combine the private key for homomorphic encryption generation and the personally identifiable sensitive information according to a specified algorithm to generate the homomorphic encryption.

The method may further include a private key input module for homomorphic encryption generation and a personal information input module to separately receive the private key for homomorphic encryption generation and the personally identifiable sensitive information.

The personally identifiable sensitive information may be unique information of an individual user and include at least one of a plurality of pieces of personal identification information including a fingerprint, an iris, and DNA.

In the extracting of the authentication code from the homomorphic encryption and the extracting of the authentication code from the PUF information, the first authentication code extraction module and the second authentication code extraction module may each extract a HMAC value as the authentication code using a HMAC-SHA512 method.

The cold wallet apparatus may further include a separate storage module configured to store the PUF information.

In the generating of the private key, the private key generation module may combine a HMAC value, which is the authentication code extracted from the homomorphic encryption, and a lower byte of the HMAC value, which is the authentication code extracted from the PUF information, in a specified manner to generate the HMAC value, and outputs the HMAC value as the private key.

In the performing of the transaction signature, the transaction signature module may further include a public key generated based on the private key to perform the transaction signature.

According to still another embodiment, a method of controlling a cold wallet apparatus includes: generating, by a processor, homomorphic encryption using personally identifiable sensitive information; extracting, by the processor, an authentication code from the homomorphic encryption; extracting, by the processor, the authentication code from PUF information of the cold wallet apparatus; combining, by the processor, the authentication code extracted from the homomorphic encryption and the authentication code extracted from the PUF information to generate a private key; and performing, by the processor, a transaction signature using a wallet account and a wallet address generated based on the private key.

In the generating of the homomorphic encryption, the processor may additionally receive a private key for homomorphic encryption generation, and combine the private key for homomorphic encryption generation and the personally identifiable sensitive information according to a specified algorithm to generate the homomorphic encryption.

In the generating of the private key, the processor may combine a HMAC value, which is the authentication code extracted from the homomorphic encryption, and a lower byte of the HMAC value, which is the authentication code extracted from the PUF information, in a specified manner to generate the HMAC value, and outputs the HMAC value as the private key.

DETAILED DESCRIPTION OF EXEMPLARY EMBODIMENTS

Hereinafter, embodiments of a cold wallet apparatus and a method of controlling the same according to the present invention will be described with reference to the attached drawings.

Figure 1:
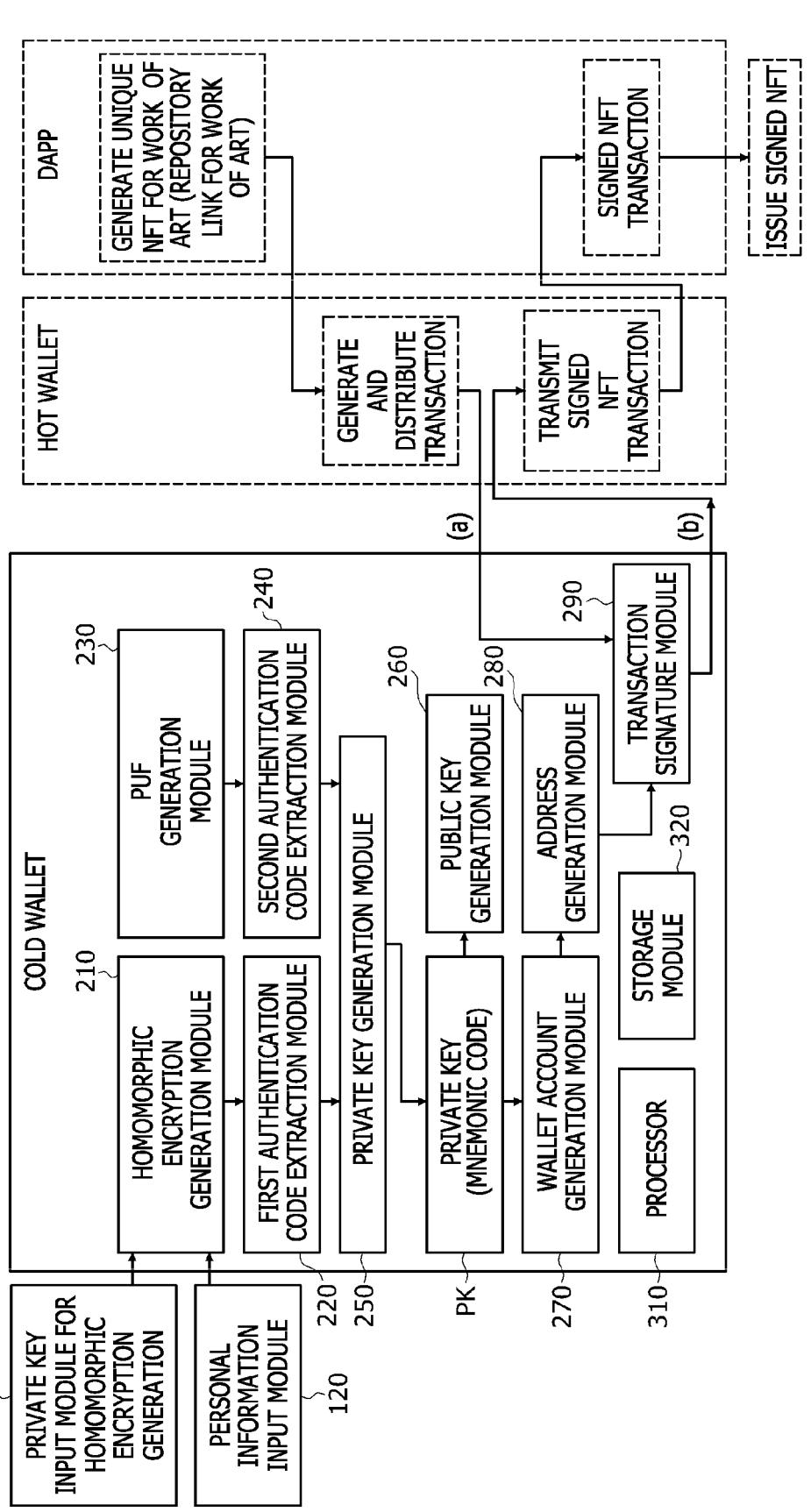
FIG. 1 is an exemplary diagram of a schematic configuration of a cold wallet apparatus according to an embodiment of the present invention.

In this process, thicknesses of lines, sizes of components, and the like, illustrated in the accompanying drawings may be exaggerated for clearness of explanation and convenience. In addition, terms to be described below are defined in consideration of functions in the present disclosure and may be construed in different ways by the intention of users or practice. Therefore, these terms should be defined on the basis of the contents throughout the present specification. FIG. 1 is an exemplary diagram of a schematic configuration of a cold wallet apparatus according to an embodiment of the present invention.

As illustrated in FIG. 1, the cold wallet apparatus according to the present embodiment includes a homomorphic encryption generation module 210, a first authentication code extraction module 220, a physical unclonable function (PUF) generation module 230, a second authentication code extraction module 240, a private key generation module 250, a public key generation module 260, a wallet account generation module 270, an address generation module 280, a transaction signature module 290, a processor 310, and a storage module 320.

In addition, the cold wallet apparatus may further include a private key input module for homomorphic encryption generation 110 and a personal information input module 120.

Referring to FIG. 1, a decentralized application (Dapp) generates a unique non-fungible token (NFT) of a work of art (i.e., digital work of art) (in this case, a repository of the work of art is linked), and generates and distributes transactions through a hot wallet.

Accordingly, the cold wallet generates a signed NFT by performing a signature including address information on the transaction and transmitting the signed NFT transaction to the Dapp through the hot wallet.

In this case, the present invention performs a transaction signature using an account and address of a cold wallet generated using uniqueness (PUF unique seed ID) information of the cold wallet itself that provides uniqueness of a semiconductor chip, and personally identifiable sensitive information such as a plurality of pieces of personally identifiable information (e.g., resident registration number and passport number) including a fingerprint or deoxyribonucleic acid (DNA), thereby ensuring uniqueness (or identification) and privacy of an NFT issuer and an author or owner of a work of art.

For reference, the hot wallet is a wallet that enables online transactions while an Internet address is connected to a network, and the cold wallet is an offline wallet with no online connection. Therefore, the cold wallet is a wallet specialized in a cryptocurrency storage function and is also called a hardware wallet. Generally, the cold wallet includes a memory device (e.g., storage module) that stores values using the semiconductor chip and a non-memory device (e.g., processor) for processing a calculation.

In addition, the Dapp is a decentralized application run on a distributed ledger system, and is composed of a specific smart contract recorded on the distributed ledger and a user program for running the specific smart contract, and performs tasks by running smart contracts existing on a blockchain through a user interface such as a web application.

The private key input module for homomorphic encryption generation 110 receives a private key (i.e., private key for homomorphic encryption generation) that will be included in homomorphic encryption when generating the homomorphic encryption. In this case, the private key for homomorphic encryption generation may be directly generated by a user according to specified regulations or automatically generated according to a specified algorithm.

The personal information input module 120 receives personal information (i.e., personally identifiable sensitive information) that will be included in homomorphic encryption when generating the homomorphic encryption. For example, the personal information (i.e., personally identifiable sensitive information) is unique information of an individual user, such as a fingerprint, an iris, and a plurality of pieces of personal identification information (e.g., resident registration number, passport number) including DNA.

The homomorphic encryption generation module 210 receives the private key for homomorphic encryption generation and the personal information (i.e., personally identifiable sensitive information), combines the private key for homomorphic encryption generation and personal information according to the specified algorithm, and then generates the homomorphic encryption according to the specified algorithm.

Here, the homomorphic encryption is a technology that processes data through various calculations such as addition and multiplication in an encrypted state, and is most effective in protecting data in use by fundamentally blocking the risk of data leakage.

The first authentication code extraction module 220 extracts an authentication code (e.g., keyed-hash message authentication code, hash-based message authentication code (HMAC) value) to confirm integrity of the homomorphic encryption generated by the homomorphic encryption generation module 210.

For example, the first authentication code extraction module 220 may use a hash-based message authentication code-secure hash algorithm 512 (HMAC-SHA512) method.

The PUF generation module 230 generates PUF information (i.e., PUF unique seed ID) (or stores the generated PUF information).

Here, the PUF is a technology that uses a difference in a microstructure of semiconductors produced in the same manufacturing process to generate a security key that cannot be physically copied, and contains unique information such as a kind of fingerprint, and a unique security key value that cannot be leaked to the outside. The second authentication code extraction module 240 extracts an authentication code (e.g., HMAC value) to confirm the integrity of the PUF information (i.e., PUF unique seed ID) generated in the PUF generation module 230.

For example, the second authentication code extraction module 240 may use the HMAC-SHA512 method.

For reference, the HMAC is a specific type of message authentication code (MAC) that involves a cryptographic hash function and a confidential encryption key, the SHA512 is a cryptographic hash function designed by the U.S. National Security Agency (NSA), and generates a 512-bit (64-byte) hash value, and the hash is used to quickly and easily detect errors or modulations in messages and provide data integrity.

The private key generation module 250 combines the authentication code (i.e., HMAC value) extracted from the homomorphic encryption and the authentication code (i.e., HMAC value) extracted from the PUF information (i.e., PUF unique seed ID) to generate the private key (or mnemonic code).

For example, the private key generation module 250 combines lower bytes of each HMAC value (i.e., the HMAC value, which is the authentication code extracted from the homomorphic encryption, and the HMAC value, which is the authentication code extracted from the PUF information) in a specified manner to generate the HMAC value, and outputs the HMAC value as a private key (or mnemonic code) PK. The public key generation module 260 generates a public key based on the private key (or mnemonic code) PK.

For reference, the private key is used to generate a digital signature or decrypt a message, and is kept secret to ensure that only the owner uses the key. In addition, the public key is a public key (e.g., wallet address) among key pairs owned by an entity used in public key cryptography. In the public key cryptography, a sender and receiver disclose their public key, and when the sender encrypts and transmits confidential contents with a receiver's public key, the receiver may decrypt the confidential contents with his/her private key and confirm the confidential content. In addition, mnemonic is a value for recovering cryptocurrency wallets such as Metamask and Kaikas, and allows an owner to recover his/her wallet even when a wallet is lost.

The wallet account generation module 270 generates a wallet account based on the private key (or mnemonic code) PK.

The address generation module 280 generates a wallet address based on the private key (or mnemonic code) PK.

The transaction signature module 290 applies to a transaction signature, including the wallet account and wallet address. In this case, the transaction signature may further include a public key.

Through the signed NFT transaction, it is possible to issue an NFT that includes the uniqueness of the cold wallet and the owner's personal information (i.e., personally identifiable sensitive information).

Here, issuing the NFT refers to recording ownership information of the NFT, which represents pre-generated meta information, on a smart contract.

In this case, each of the components 210 to 290 included in the cold wallet apparatus may be expressions of different functions performed by the processor according to a control command provided by a program code, or may be implemented integrally by at least one processor 310 or may be implemented separately.

In addition, the processor 310 may include a storage module 320 to store information needed when executing program code.

Figure 2:
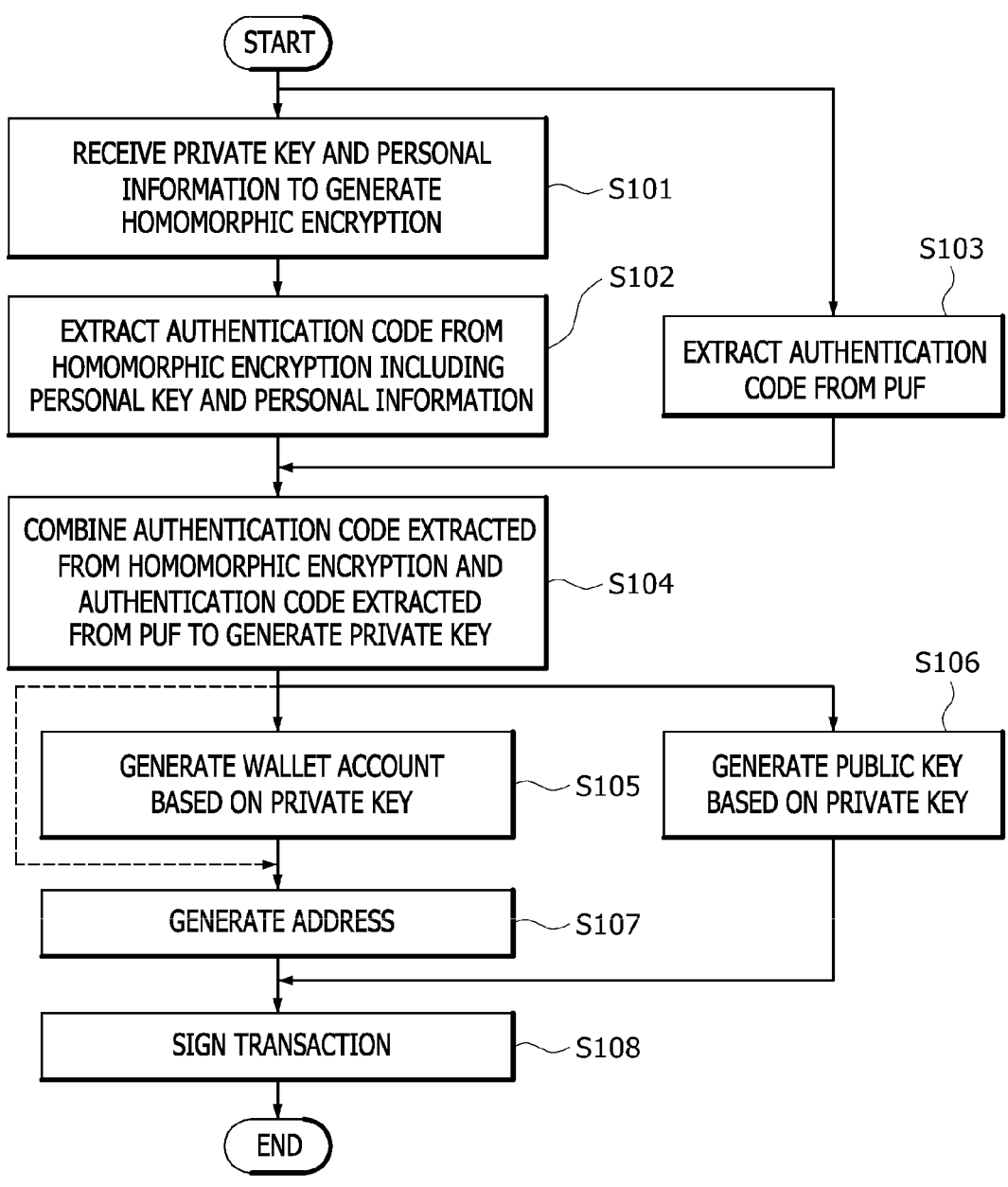
FIG. 2 is a flowchart for describing a method of controlling a cold wallet apparatus according to an embodiment of the present invention.

FIG. 2 is a flowchart for describing a method of controlling a cold wallet apparatus according to an embodiment of the present invention.

Referring to FIG. 2, the processor 310 of the cold wallet apparatus receives and combines a private key (i.e., private key for homomorphic encryption generation) that will be included in homomorphic encryption when generating the homomorphic encryption, and personal information (i.e., personally identifiable sensitive information) that will be included in homomorphic encryption when generating the homomorphic encryption, and then generate the homomorphic encryption according to the specified algorithm (S101).

In addition, the processor 310 extracts an authentication code (e.g., HMAC value) to confirm the integrity of the generated homomorphic encryption (S102) and extracts the authentication code (e.g., HMAC value) to confirm the integrity of the PUF information (i.e., PUF unique seed ID) (S103).

In addition, the processor 310 combines the authentication code (i.e., HMAC value) extracted from the homomorphic encryption and the authentication code (i.e., HMAC value) extracted from the PUF information (i.e., PUF unique seed ID) to generate the private key (or mnemonic code).

For example, the processor 310 combines lower bytes of each HMAC value (i.e., the HMAC value, which is the authentication code extracted from the homomorphic encryption, and the HMAC value, which is the authentication code extracted from the PUF information) in a specified manner to generate the HMAC value, and outputs the HMAC value as a private key (or mnemonic code) PK.

In addition, the processor 310 generates the public key based on the private key (or mnemonic code) PK (S106), generates the wallet account based on the private key (or mnemonic code) PK (S105), and also generates the wallet address based on the private key (or mnemonic code) PK (S107).

In addition, the processor 310 performs the transaction signature including the wallet account and wallet address (S108). In this case, the transaction signature may further include a public key.

Through the signed NFT transaction, it is possible to issue an NFT that includes the uniqueness of the cold wallet and the owner's personal information (i.e., personally identifiable sensitive information).

As described above, the present invention performs the transaction signature using the account and address of the cold wallet generated using the uniqueness (PUF unique seed ID) information of the cold wallet itself that provides the uniqueness of the semiconductor chip and the personally identifiable sensitive information such as the plurality of pieces of personally identifiable information (e.g., resident registration number and passport number) including a fingerprint or DNA, thereby ensuring the uniqueness (or identification) and privacy of the NFT issuer and the author or owner of a work of art.

In addition, the present invention solves the existing problem of issuing and distributing an NFT even when a person issuing an NFT is not an original author of the work of art, and performs the transaction signature for proving that the person issuing the NFT is the original author or owner of the work of art, thereby preventing fraudulent activities, etc.

The present invention can ensure private information that using which an original author or owner of a digital asset can be identified and issuing a non-fungible token (NFT) including the information. Accordingly, it is possible to prove an original author or owner of a digital asset (e.g., a digital work of art), if necessary, while ensuring the private information on the original author or owner of the digital asset (e.g., a digital work of art).

Although the present invention has been described with reference to embodiments shown in the accompanying drawings, it is only an example. It will be understood by those skilled in the art that various modifications and equivalent other exemplary embodiments are possible from the present invention. Accordingly, a true technical scope of the present invention is to be determined by the spirit of the appended claims. Implementations described herein may be implemented in, for example, a method or process, an apparatus, a software program, a data stream, or a signal. Although discussed only in the context of a single form of implementation (e.g., discussed only as a method), implementations of the discussed features may be implemented in other forms (e.g., an apparatus or program). The apparatus may be implemented in suitable hardware, software, and firmware, and the like. A method may be implemented in an apparatus such as a processor, which generally refers to a computer, a microprocessor, an integrated circuit, a processing device including a programmable logic device, or the like.

What is claimed is:

1. A cold wallet apparatus comprising:
one or more processors;
a memory storing instructions that, when executed by the one or more processors, cause the one or more processors to perform the steps of:
generating homomorphic encryption using personally identifiable sensitive information;
extracting an authentication code from the homomorphic encryption;
extracting an authentication code from physical unclonable function (PUF) information of the cold wallet apparatus;
combining the authentication code extracted from the homomorphic encryption and the authentication code extracted from the PUF information to generate a private key; and
performing a transaction signature using a wallet account and a wallet address generated based on the private key.

2. The cold wallet apparatus of claim 1, wherein the one or more processors additionally receive a private key for homomorphic encryption generation, and combine the private key for homomorphic encryption generation and the personally identifiable sensitive information according to a specified algorithm to generate the homomorphic encryption.

3. The cold wallet apparatus method of claim 2, wherein the one or more processors separately receive the private key for homomorphic encryption generation and the personally identifiable sensitive information.

4. The cold wallet apparatus of claim 1, wherein the personally identifiable sensitive information is unique information of an individual user and includes at least one of a plurality of pieces of personal identification information including a fingerprint, an iris, and deoxyribonucleic acid (DNA).

5. The cold wallet apparatus of claim 1, wherein the one or more processors extract a hash-based message authentication code (HMAC) value as the authentication code using a hash-based message authentication code-secure hash algorithm 512 (HMAC-SHA512) method.

6. The cold wallet apparatus of claim 1, further comprising a separate storage module configured to store the PUF information.

7. The cold wallet apparatus of claim 1, wherein the one or more processors combine a hash-based message authentication code (HMAC) value, which is the authentication code extracted from the homomorphic encryption, and a lower byte of the HMAC value, which is the authentication code extracted from the PUF information, in a specified manner to generate the HMAC value, and generate the HMAC value as the private key.

8. The cold wallet apparatus of claim 1, wherein the one or more processors perform the transaction signature further using a public key generated based on the private key.

9. A method of controlling a cold wallet apparatus, comprising:

generating, by a homomorphic encryption generation module, homomorphic encryption using personally identifiable sensitive information;

extracting, by a first authentication code extraction module, an authentication code from the homomorphic encryption;

extracting, by a second authentication code extraction module, an authentication code from physical unclonable function (PUF) information of the cold wallet apparatus;

combining, by a private key generation module, the authentication code extracted from the homomorphic encryption and the authentication code extracted from the PUF information to generate a private key; and performing, by a transaction signature module, a transaction signature using a wallet account and a wallet address generated based on the private key.

10. The method of claim 9, wherein, in the generating of the homomorphic encryption, the homomorphic encryption generation module additionally receives a private key for homomorphic encryption generation, and combines the private key for homomorphic encryption generation and the personally identifiable sensitive information according to a specified algorithm to generate the homomorphic encryption.

11. The method of claim 10, further comprising a private key input module for homomorphic encryption generation and a personal information input module to separately receive the private key for homomorphic encryption generation and the personally identifiable sensitive information.

12. The method of claim 9, wherein the personally identifiable sensitive information is unique information of an individual user and includes at least one of a plurality of pieces of personal identification information including a fingerprint, an iris, and DNA.

13. The method of claim 9, wherein, in the extracting of the authentication code from the homomorphic encryption and the extracting of the authentication code from the PUF information, the first authentication code extraction module and the second authentication code extraction module each extract a hash-based message authentication code (HMAC) value as the authentication code using a HMAC-SHA512 method.

14. The method of claim 9, wherein the cold wallet apparatus further includes a separate storage module configured to store the PUF information.

15. The method of claim 9, wherein, in the generating of the private key, the private key generation module combines a hash-based message authentication code (HMAC) value, which is the authentication code extracted from the homomorphic encryption, and a lower byte of the HMAC value, which is the authentication code extracted from the PUF information, in a specified manner to generate the HMAC value, and outputs the HMAC value as the private key.

16. The method of claim 9, wherein, in the performing of the transaction signature, the transaction signature module further includes a public key generated based on the private key to perform the transaction signature.

17. A method of controlling a cold wallet apparatus, comprising:

generating, by a processor, homomorphic encryption using personally identifiable sensitive information;

extracting, by the processor, an authentication code from the homomorphic encryption;

extracting, by the processor, an authentication code from PUF information of the cold wallet apparatus;

combining, by the processor, the authentication code extracted from the homomorphic encryption and the authentication code extracted from the PUF information to generate a private key; and performing, by the processor, a transaction signature using a wallet account and a wallet address generated based on the private key.

18. The method of claim 17, wherein, in the generating of the homomorphic encryption, the processor additionally receives a private key for homomorphic encryption generation, and combines the private key for homomorphic encryption generation and the personally identifiable sensitive information according to a specified algorithm to generate the homomorphic encryption.

19. The method of claim 17, wherein, in the generating of the private key, the processor combines a hash-based message authentication code (HMAC) value, which is the authentication code extracted from the homomorphic encryption, and a lower byte of the HMAC value, which is the authentication code extracted from the PUF information, in a specified manner to generate the HMAC value, and outputs the HMAC value as the private key.

* * * * *